(12) United States Patent
McDonald

(10) Patent No.: US 7,730,586 B2
(45) Date of Patent: *Jun. 8, 2010

(54) LOCKING HINGE ASSEMBLY

(75) Inventor: Curt Andrew McDonald, Howell, MI (US)

(73) Assignee: Ovidon Manufacturing LLC, Howell, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/079,811

(22) Filed: Mar. 28, 2008

(65) Prior Publication Data

US 2008/0178428 A1 Jul. 31, 2008

Related U.S. Application Data

(63) Continuation of application No. 11/178,770, filed on Jul. 11, 2005, now Pat. No. 7,422,047.

(51) Int. Cl.
*E05D 11/10* (2006.01)
(52) U.S. Cl. ..................................................... 16/326
(58) Field of Classification Search .................. 16/326, 16/380, 387–388, 324, 327, 328, 352, 353; 292/300, 303, 295, 296, 292
See application file for complete search history.

(56) References Cited

U.S. PATENT DOCUMENTS

| | | | | | |
|---|---|---|---|---|---|
| 1,092,926 | A | * | 4/1914 | Madsen | 16/388 |
| 1,456,886 | A | * | 5/1923 | Gober | 16/343 |
| 2,431,263 | A | * | 11/1947 | Lundgren | 4/236 |
| 2,797,432 | A | * | 7/1957 | Gakle | 16/388 |
| 2,878,510 | A | * | 3/1959 | Burke | 16/326 |
| 3,046,595 | A | * | 7/1962 | Johansson et al. | 16/343 |
| 3,336,075 | A | * | 8/1967 | Wilson | 296/146.4 |
| 3,805,325 | A | * | 4/1974 | Lee | 16/262 |
| 3,811,150 | A | * | 5/1974 | Chalmers | 16/352 |
| 4,268,997 | A | | 5/1981 | Conkey | |
| 4,351,555 | A | | 9/1982 | Hashimoto | |
| 4,709,121 | A | | 11/1987 | Shores | |
| 4,762,258 | A | | 8/1988 | Murphy | |
| 6,151,757 | A | * | 11/2000 | Beals et al. | 16/380 |
| 6,317,928 | B1 | | 11/2001 | Guillemette | |
| 6,416,107 | B1 | | 7/2002 | Kanaguchi et al. | |

(Continued)

OTHER PUBLICATIONS

Stow 'n Go 2004 Auto Show, Auto Show News, Dodge website, Jan. 5, 2004, Auburn Hills, Michigan 2 pages.

*Primary Examiner*—Chuck Y. Mah
(74) *Attorney, Agent, or Firm*—Reising Ethington P.C.

(57) ABSTRACT

A locking hinge assembly (32) has first and second hinge members (38, 40) having a respective hinge section (50, 51), proximate wall (46, 47) and mounting flange section (42, 43) for mounting on respective first and second panels (24, 26). The first and second hinge members are pivotably connected together at the hinge sections and are pivotably movable between a first position and a second position. The mounting flange section (42) has a channel (54) extending along the proximate wall section (48) for slidably receiving a locking member (56). The locking member (56) has at least one locking flange (60) extending through aligned apertures in the proximate walls. The locking flange has a hook section (62) at a distal end such that when the locking member slides to a locking position, the hook section engages a proximate wall to lock the hinge members in the first position.

9 Claims, 5 Drawing Sheets

U.S. PATENT DOCUMENTS

| | | |
|---|---|---|
| 6,523,223 B2 | 2/2003 | Wang |
| 6,644,709 B2 | 11/2003 | Inagaki et al. |
| 6,719,363 B2 | 4/2004 | Erlandsson et al. |
| 6,837,530 B2 | 1/2005 | Rudberg et al. |
| 6,869,138 B2 | 3/2005 | Rhodes et al. |
| 6,874,840 B2 | 4/2005 | Neale |
| 6,983,985 B2 | 1/2006 | McGowan et al. |
| 7,000,290 B1 | 2/2006 | Ace |
| 7,296,832 B1 * | 11/2007 | Campbell ............... 292/292 |
| 7,322,629 B2 | 1/2008 | McClintock |
| 7,422,047 B1 * | 9/2008 | McDonald ............... 160/229.1 |
| 2006/0170235 A1 | 8/2006 | Oilar et al. |

\* cited by examiner

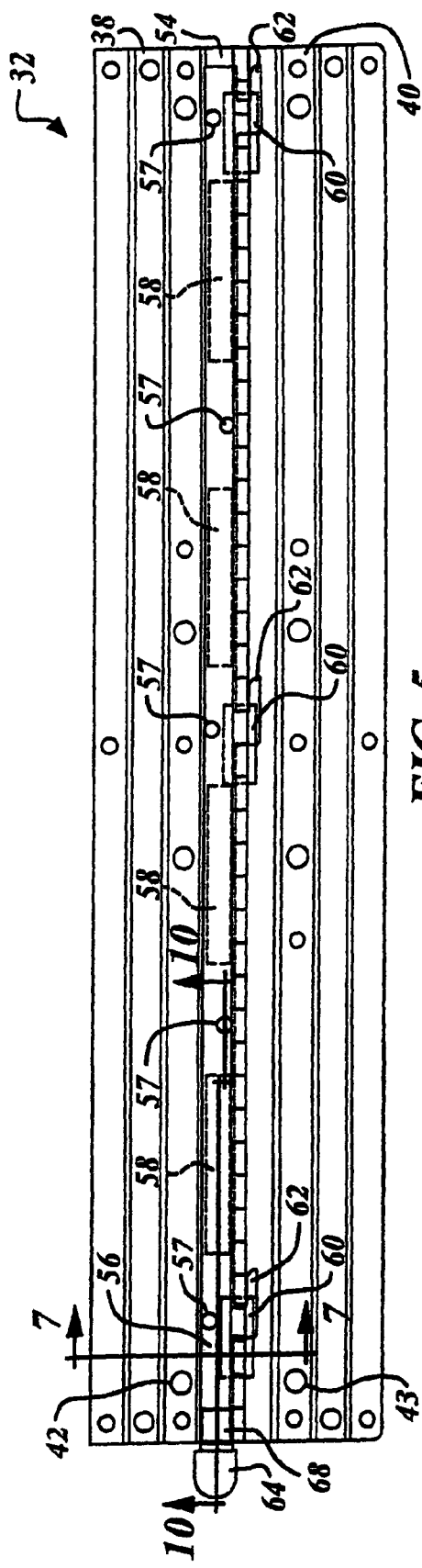

LOCKING HINGE ASSEMBLY

This application is a continuation of U.S. patent application Ser. No. 11/178,770 filed Jul. 11, 2005 now U.S. Pat. No. 7,422,047.

TECHNICAL FIELD

The field of this invention relates to a lockable hinge for a floor panel system for use in motor vehicles.

BACKGROUND OF THE DISCLOSURE

Stowable seats in motor vehicles have long been a desired feature in motor vehicles where the seats in the second and third row may fold down to form a flat cargo floor in order to easily receive and maneuver large pieces of cargo.

Recent developments have provided stowable seats that are stowed under the cargo area and covered by a flat panel system to provide the flat cargo floor. The flat panel system is also used as a floor surface for passengers' feet when the seats are deployed to their upright seating position. The flat panel system is made from a plurality of panels pivotably connected together to move between a flat closed position and a folded up open position. The cargo space under the panel system is usable as cargo storage space for other items when the seats are deployed in the upright seating position. A flat panel system can also be referred to as a stow-to-floor seat assembly door.

One needs to open the panels to access the cargo space. Hence, the area above the panels must be free from obstruction, for example free from interference of another seat or center consul to allow room for the pivoting panels to freely operate in their intended fashion. In previous systems, either the entire motor vehicle needed to be extended to provide the necessary clearance for the panels or certain seats needed to be moved to a certain position to allow the panels to freely move between open and closed positions.

Cargo space access needs to be convenient in order for the consumer to use the space in its intended fashion. Thus any interference or obstacle introduced by a movable seat or a seat track will limit the use of the cargo area. It is desirable to access the cargo area independent of any fore and aft adjustment of seats. Previous cargo panel systems were freely operational only if the front seats were in a forward position.

What is needed is an improved panel system that can be adaptable to be substantially opened independent of any position of an adjacent seat for ease of access to the under panel cargo space. What is also needed is a cargo panel that has a hinge that can be either in a locked or release position. What is also needed is a lockable hinge in which the lock mechanism is substantially concealed under the panels.

SUMMARY OF THE DISCLOSURE

In accordance with one aspect of the invention, a locking hinge assembly pivotably connects first and second panels. The hinge assembly has a first and second hinge member with respective mounting flange sections for mounting respective first and second panels at the bottom sides of the panels. Proximate wall sections of the first and second hinge member extend between the first and second panels and extend toward opposite upper sides of the panels. Hinge sections of the first and second hinge members engage each other between the two panels in proximity to the opposite upper sides for providing pivotal motion of one panel with respect to the other panel. A mounting flange section of the first hinge member has a recessed channel under the bottom side of the respective panel.

A locking bar is slidably mounted between a locking position and a release position in the channel. The proximate wall section of the first hinge member has at least one respective aperture therethrough that receives at least one locking flange of the locking bar. The proximate wall of the second hinge member has locking surfaces axially spaced there along and release spaces interposed therebetween. Each locking flange has a distal lock section that is slidable between a release position to be aligned with the respective release spaces of the proximate wall section to allow the hinge members to pivotably move with respect to one another and a lock position misaligned from the released spaces and engagable with the locking surfaces to lock the first hinge member to the second hinge member.

To help prevent rattling within the channel, the locking bar preferably has protrusions that extend downward from bar and the upper surface of the bar abuts against the bottom side of the first panel.

It is also preferable that the locking bar has a width that substantially extends across the entire width of the channel. A leaf spring mounted is preferably installed under the bar to bias the bar to abut the bottom side of the first panel. It is preferable that the release spaces are in the form of apertures to allow the distal lock section to pass through the apertures and lock the hinge assembly when the panels are planar with respect to each other. The distal lock section is in the form of a hook to engage the proximate wall of the second hinge member at an opposing surface from the first hinge member. In one embodiment, the locking bar extends substantially the length of the hinge and has a handle at one end thereof.

In accordance with another aspect of the invention, a locking hinge assembly has first and second hinge members having a respective hinge section, proximate wall, and mounting flange section for mounting on respective first and second panels. The first and second hinge members are pivotably connected together at the hinge sections and are pivotably movable between a first position and a second position. The mounting flange section has a channel extending along the proximate wall section for slidably receiving a locking member. The locking member has at least one locking flange extending through aligned apertures in the proximate walls. The locking flange has a hook section at a distal end such that when the locking member slides to a locking position, the hook section engages a proximate wall to lock the hinge members in the first position.

In accordance with another aspect of the invention, a locking hinge assembly has a first hinge member and a second hinge member hingeably connected to the first hinge member along a pivot axis for pivotable motion between a first lockable position and a second position. The first and second hinge member have respective first and second proximate walls extending from the pivot axis and proximate to each other when in the first lockable position At least one aperture is in the first proximate wall aligned with at least one aperture in the second proximate wall when the hinge assembly is in the first lockable position. A locking member extends through at least one of the apertures of the first and second proximate walls and movable between a lock position to engage the proximate walls of the first and second hinge member and a release position where the locking member disengages from at least one of the proximate walls and allows the hinge assembly to pivot.

In accordance with another aspect of the invention, a foldable panel assembly for a storage area of motor vehicle has a first panel and a second panel being connected together along first and second edges of the respective panels. A hinge assembly has first and second hinge members each with a mounting plate mounted to an underside of the respective first and second panel. The first and second hinge members each have a respective proximate wall that abuts the first and second edges of the respective panels extending transversely from the mounting plates. The proximate walls each end with a hinge section that engages each other to pivotably connect the first panel to the second panel. The hinge section is in proximity to upper sides of the panels. A locking bar is slidably mounted to the mounting plate of the first hinge member under the first panel for sliding motion along the edges of the first panel between a first locking position and a second release position. The mounting plate of the second hinge member has a locking surface for engaging a flange of the locking bar when in the first locking position for preventing the hinge assembly from pivoting.

In accordance to another aspect of the invention, a stow-to-floor seat assembly door has a first panel pivotably connected relative a second panel by a first hinge. A third panel is pivotably connected relative the second panel by a locking hinge. Pivotable movement of the second panel relative the third panel is restricted when the locking hinge is in a locked state. The third panel is pivotably connected to a vehicle floor by a second hinge to permit unobstructed access to a stowage cavity under the vehicle floor for stowing a collapsible stow-to-floor seat. The locking hinge includes a locking rod and a pivot pin that connects a first hinge panel and a second hinge panel. The locking rod traverses the first hinge panel and the second hinge panel. The locking rod includes locking tabs that extend through passages formed in the first hinge panel and second hinge panel.

BRIEF DESCRIPTION OF THE DRAWINGS

Reference now is made to the accompanying drawings in which:

FIG. 5 is a top plan view of the hinge assembly in the locked position;

FIG. 6 is a view similar to FIG. 5 showing the hinge assembly in the release position;

DETAILED DESCRIPTION OF THE PREFERRED EMBODIMENT

Figure 1:
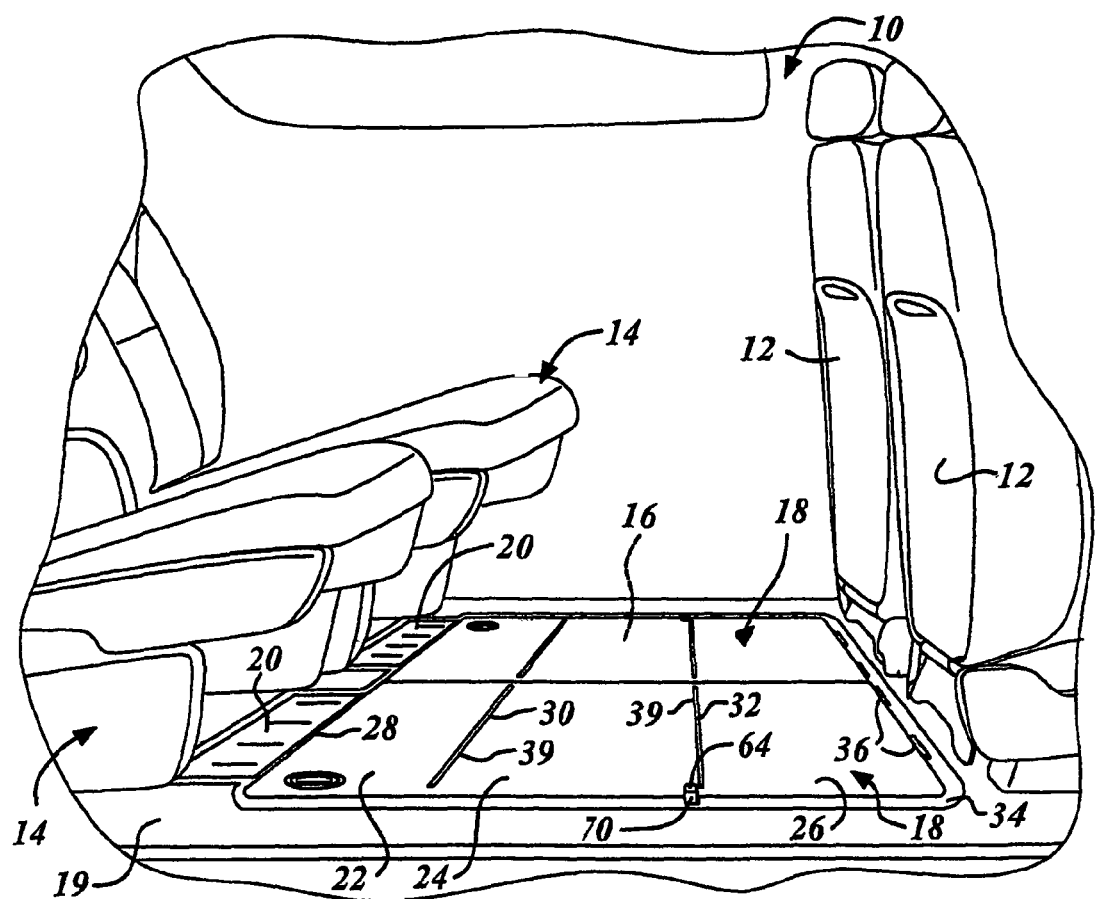
FIG. 1 is a fragmentary perspective view of a motor vehicle interior illustrating one embodiment of the panel assembly in the closed position according to the invention.

Referring now to FIGS. 1-4, a motor vehicle 10 has front adjustable seats 12 and rear stowable seats 14 also referred to as collapsible stow-to-floor seats. Each seat can be stowed in a cargo space 16 also referred to as a stowage cavity under floor panel assembly 18 also referred to as a stow-to-floor assembly door. The panel assembly 18 forms part of a flat cargo area floor 19 when the rear seats 14 are stowed in the cargo space 16 and also form the floor for passengers' feet when the seats 14 are in the deployed upright seating position as shown in FIG. 1. The panel assembly can move between the closed position shown in FIG. 1, an intermediate position shown in FIG. 2, a first open mode in FIG. 3 or a second open mode shown in FIG. 4.

The panel assembly 18 includes a rear flap 20 and three panels 22, 24, and 26 all connected together with piano hinge assemblies 28, 30, and 32. Panel 22 may be referred to as a first panel, panel 24 may be referred to as a second panel and panel 26 may be referred to as a third panel. Hinge 28 may also be referred to as a flap hinge. Hinge 30 may also be referred to as a first hinge and hinge 32 may also be referred to as a locking hinge. The third panel 26 is pivotably connected to a floor rim assembly 34 through hinges 36 which can also be referred to collectively as a second hinge. The floor rim assembly 34 may also be considered part of the vehicle floor 19. The entire panel assembly 18 lies flat to form the floor 19 with the hinge 28 completely concealed and hinges 30, 32 mostly concealed with only pivoting hinge sections 39 visible between the panels 22, 24, 26.

Reference now is made to FIGS. 5-10 for describing the hinge assembly 32 i.e. the locking hinge. Hinge assembly 32 has a first hinge member 38 also referred to as a first hinge panel and a second hinge member 40 also referred to as a second hinge panel. Each member 38 and 40 has respective mounting flanges 42, 43 mounted to the underside 44, 45 of each first and second panel 24 and 26. Fasteners or adhesive may be used to affix the mounting flanges 42 and 43 to the panels 24 and 26. The mounting flanges 42 and 43 each are integrally formed with a proximate wall section 46 and 47. Each section 46 and 47 extends upward transversely from the mounting flanges 42, 43 between the two panels 24 and 26 and abuts the edges 48 and 49 of the two adjacent panels 24 and 26. The hinge section 39 is formed by hinge sections 50 and 51 of member 38 and 40 pivotably connected together with a pin member 52 also called a pivot pin.

Mounting flange section 42 has a channel section 54 spaced from the underside 44 of the panel to provide for a locking bar 56 to be slidably movable between a lock position also referred to as a locked state as shown in FIG. 5 and an unlock or release position in FIG. 6. The bar 56 has a width that substantially extends across the entire width of the channel 54, a height that spans substantially the entire distance between the channel 54 and underside 44 of panel 24. The height may be made up by embossments 57 both axially spaced and laterally spaced along the bar to contact the channel 54. Leaf springs 58 may be positioned in the channel 54 under the bar 56 to bias it upward against the underside 44 of panel 24. This construction reduces any rattling from the bar 56 with respect to its surrounding members and mostly conceals bar 56 from above.

Figure 10:
FIG. 10 is a cross-sectional view taken along lines 10-10 shown in FIG. 5.
Figure 11:
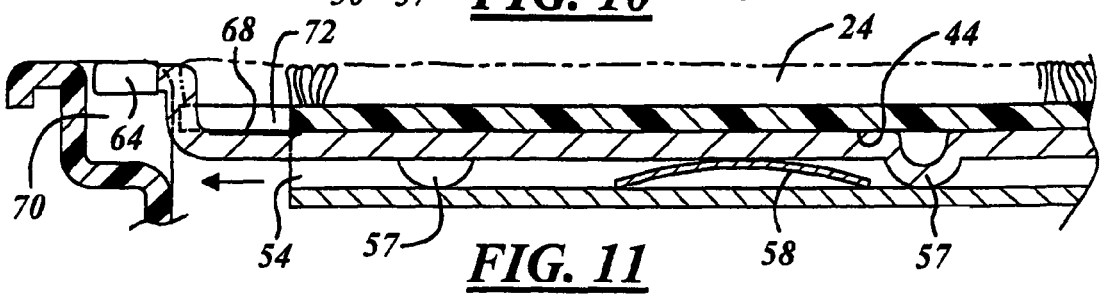
FIG. 11 is a view similar to FIG. 10 showing the lock bar handle in the release position.

The bar has three flanges 60 axially spaced therealong. Each flange 60 has a hook section 62. These flanges 60 and hook sections 62 may also be referred to as locking tabs. Each proximate wall 46 and 47 has aligned apertures 66, 67 that receive the flanges 60 and hook sections 62. The flanges 60 extend through the apertures 66, 67 and are slidably received in channel section 55 of mounting flange 43 of hinge member 40 beneath the underside 45 of panel 26 such that the locking rod traverses both the first and second hinge panel. When the bar is in the release position as shown in FIGS. 6 and 11, the hook section 62 and flange 60 are free to laterally pass through the apertures 67 also called passages as the hinge members 38 and 40 pivotably move with respect to each other. When the bar is moved to the locked position also referred to as the locked state as shown in FIGS. 5 and 10, the hook abuts the proximate wall 47 at its opposing surface 53 to prevent the hinge members 38 and 40 from pivotably moving with respect to each other, thus causing pivotable movement of the second panel relative to the third panel to be restricted.

The bar is moved between its release and locked position by a handle 64 that is situated at one end of the bar at a lateral edge of the panel assembly 18. The handle 64 may extend upward to be accessible above the panels 24 and 26. Alternatively and as shown in the drawings, the handle 64 may be located to be received in a recess 70 in rim assembly 34 as it moves to the release position as shown in FIG. 11. Furthermore, panel 24 has a notch 72 to allow handle 64 to slide to the lock position as shown in FIG. 10. With this construction, handle 64 is accessible by an operator but remains below the floor 19 when the panel 24 is in the closed position as shown in FIGS. 1, 2, 10 and 11. The handle 64 may have a rubber or plastic cap 65 thereon that is color coordinated with the panels 24 and 26. The locking bar may have an orange or other bright color indicator section 68 located in proximity to the handle that becomes visible at the lateral edge of the panels through notch 72 when the handle is in the release position. The color indicates, when visible through notch 72, that the hinge is in the release or second open mode of operation. Conversely, when the section 68 is concealed, the hinge is in the locked or first open mode of operation.

Figure 2:
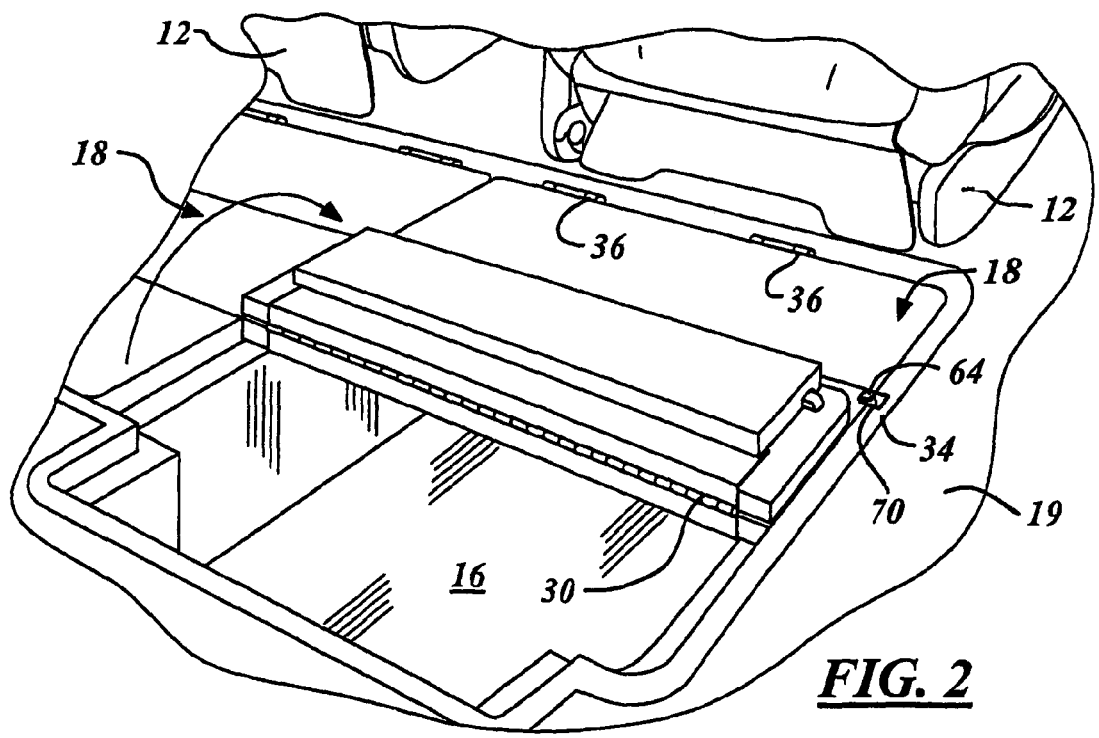
FIG. 2 is perspective view of the panel assembly shown in FIG. 1 in an intermediate position.
Figure 3:
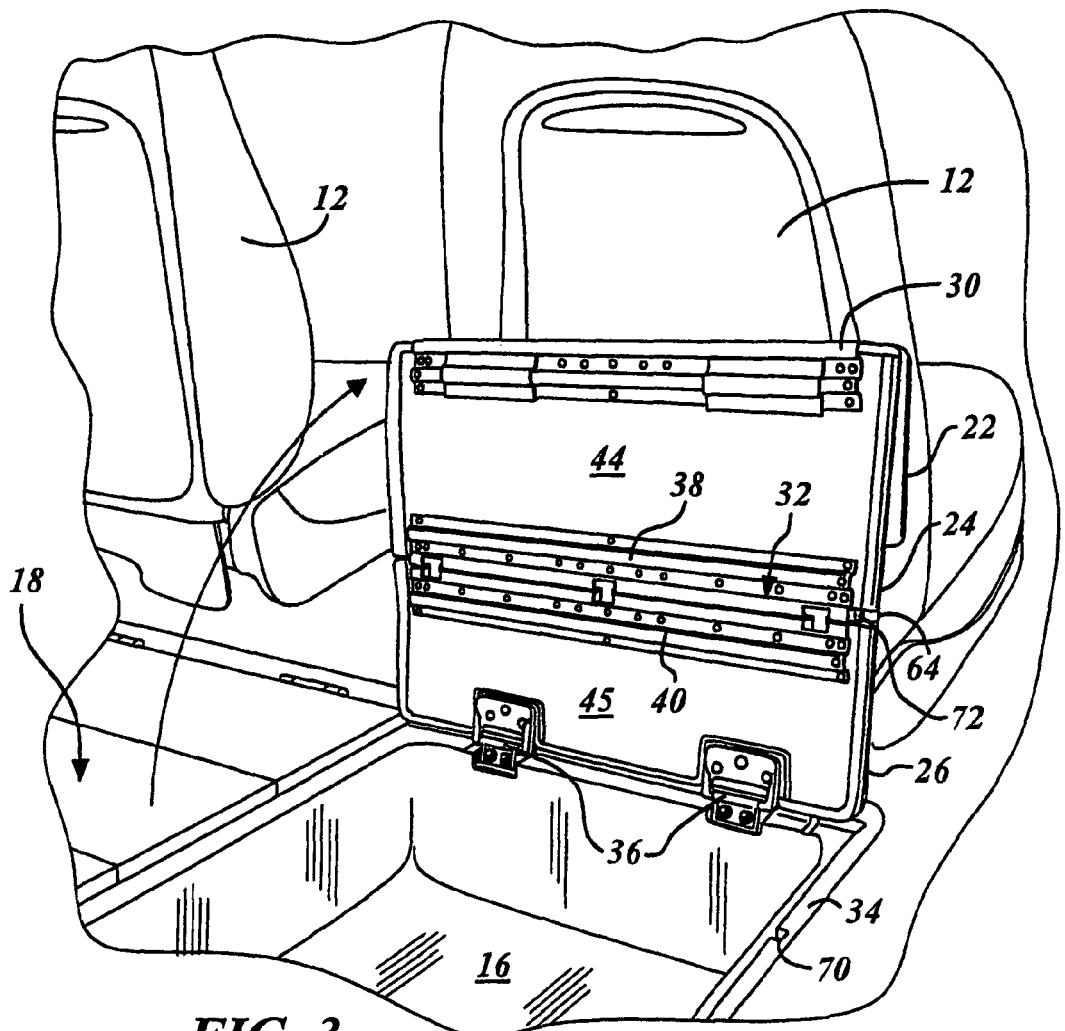
FIG. 3 is view similar to FIG. 2 showing the panel assembly in the first open mode with the hinge 32 in the locked position for retrieving and stowing the stowable seat.

In operation, the panel can open in a first or second open mode. When the handle and locking bar are in the locked position, the hinged panels 24 and 26 are locked together as a single panel. When such a lockup occurs between the panels 24 and 26, they then move as one. When one desires to deploy or stow the seat 14 from in the cargo space 16, the hinge panels 24 and 26 are preferred to lock together by locked hinge 32. The front seat 12 needs to be in a forward position to clear the front hinge 36. As shown in FIGS. 2 and 3, after the rear flap 20 and panel 22 are pivoted to the open position, the combined panels 24 and 26 are lifted to the first open mode position to provide unobstructed access to the cargo space i.e. stowage cavity. After the seat is either stowed or deployed as desired, the process is then reversed and the panels 24 and 26 close together flat with floor 19. The panel 22 and rear flap 20 are then closed to again achieve the closed position shown in FIG. 1.

Figure 4:
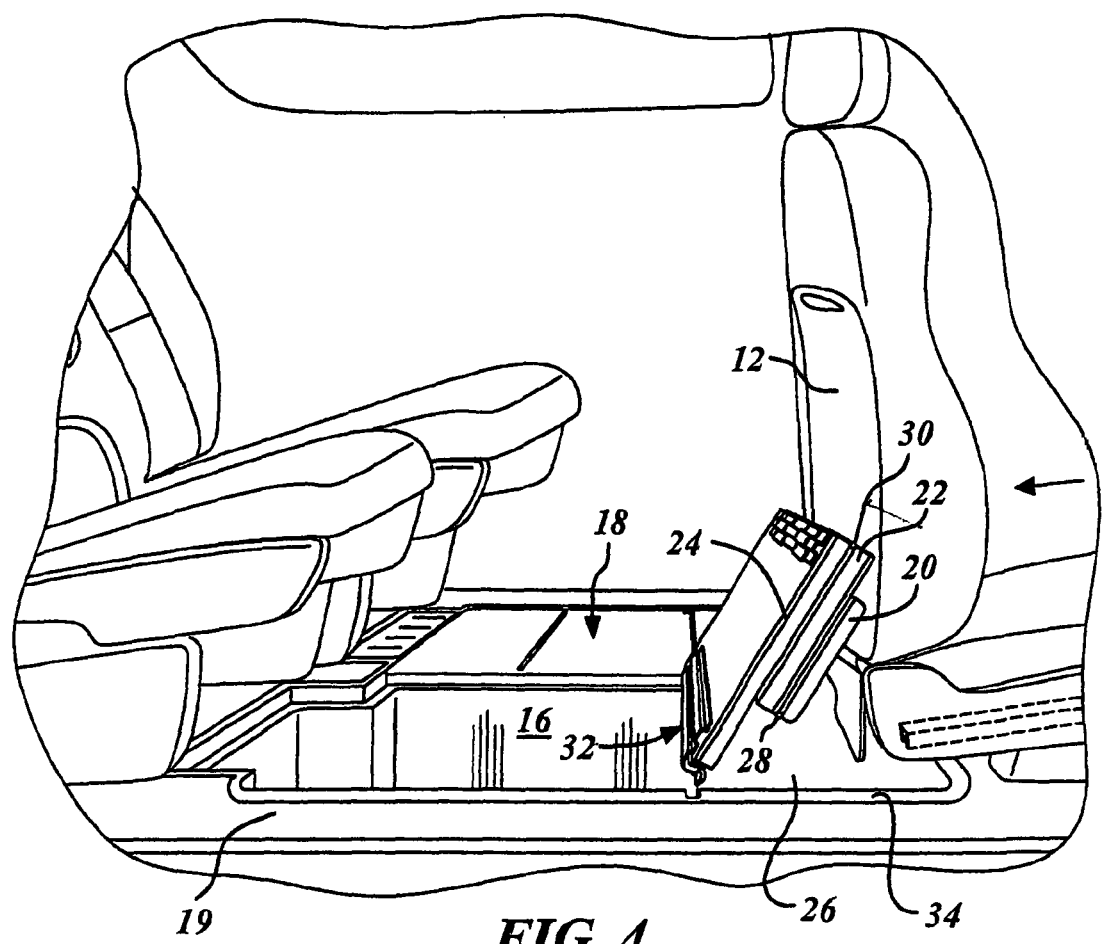
FIG. 4 is a view similar to FIG. 1 showing the panel assembly in a second open mode position.
Figure 7:
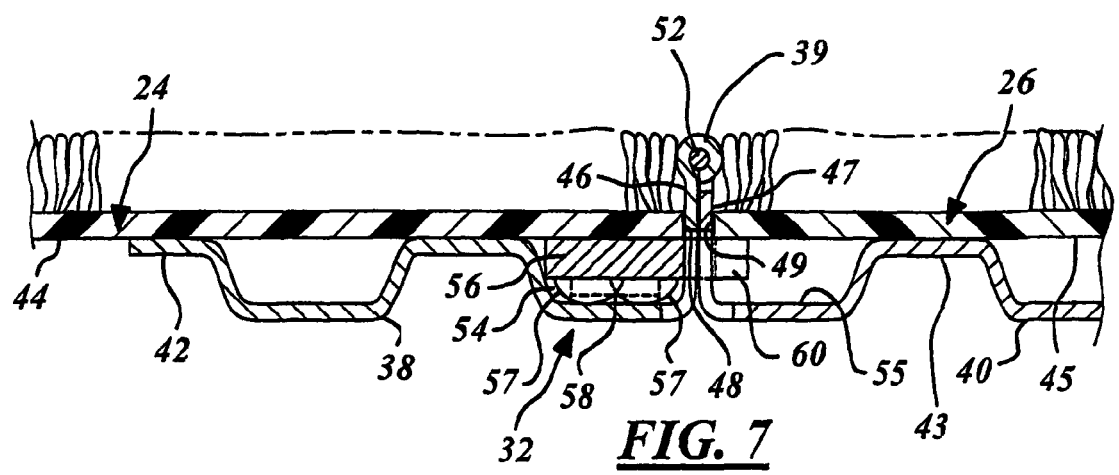
FIG. 7 is a cross-sectional view taken along lines 7-7 shown in FIG. 5.
Figure 8:
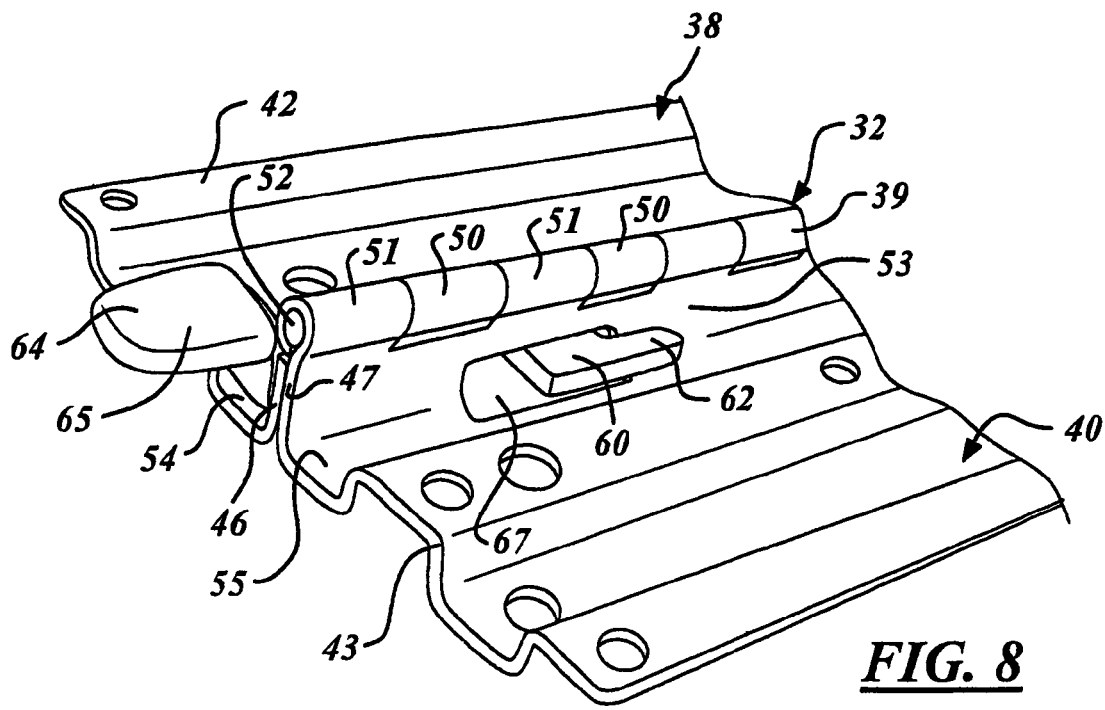
FIG. 8 is an enlarged close up view of a hook portion shown in the locked position.
Figure 9:
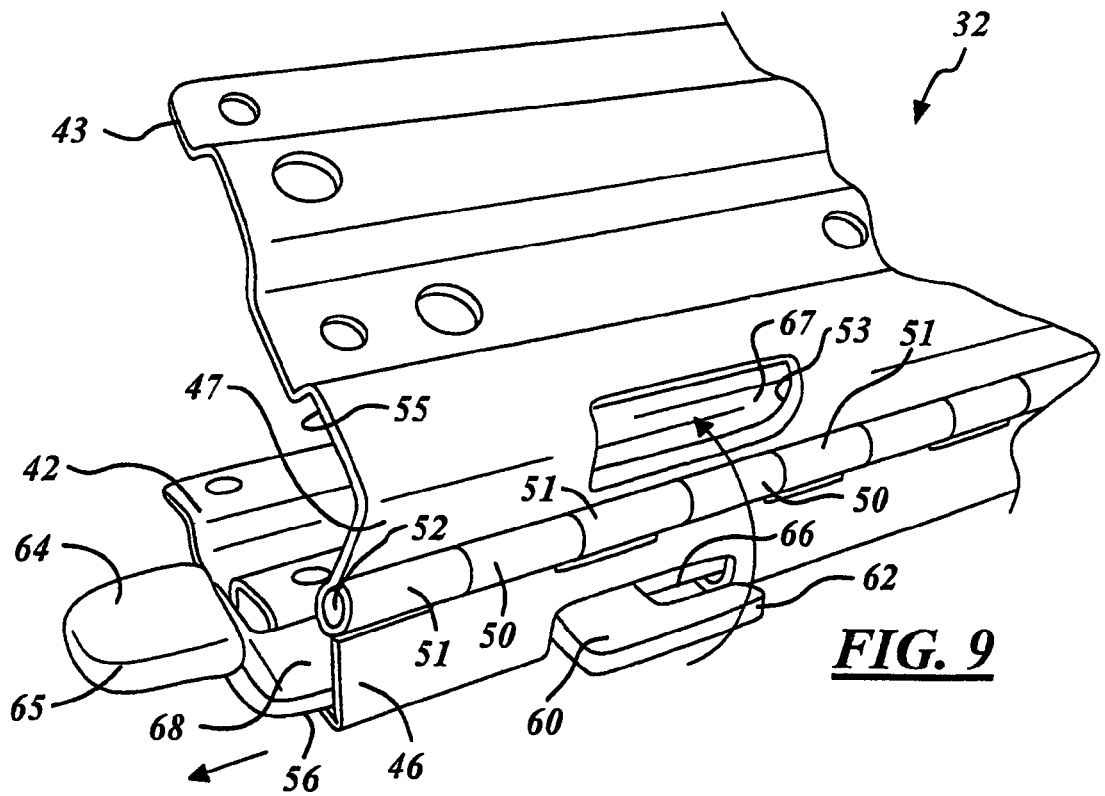
FIG. 9 is an enlarged close up view of a hook portion shown in the release position.

It is foreseen that the deployment and storage of the seats 14 are a relatively infrequent occurrence compared to the opening and closing of the panel assembly 18 for access to the cargo area 16 for other storage purposes. For these purposes, it is not necessary to move the front seats 12 forward to provide access to the cargo space 16. The handle can be operated to move the bar to the unlock position which allows the panel 24 to pivot with respect to panel 26, such that upon opening the rear flap 20 and first panel 22 as shown in FIG. 2, the panel 24 can be pivoted open while panel 26 remains flat as illustrated in FIG. 4 to achieve a second open mode position. The open panels 22 and 24 along with flap 20 can rest over centered against the front seat 12 as the seat 12 may extend rearwardly as illustrated in FIG. 4, over the panel 26. Thus, even while the front seats 12 may be in the rear extended position and prevent panel 26 from opening at hinge 36, the cargo area 16 can be accessed because a substantial portion of the panel assembly 18 may be opened in a second mode as shown in FIG. 4.

Panels 22, 24 and 26 may have different widths than the widths shows and the hinge 32 may be aligned just rearward of the most rearward position of the front seats to allow the hinge 32 to pivot the panels 22 and 24 over center and allow the panels to rest in the open position.

As such, the panel assembly may be opened in one of two modes, one for storing and deploying the stowable seat and the other for otherwise accessing the cargo space 16. The front seats 12 need to be moved forward only when the stowable seats 14 need to be stowed or deployed. Otherwise, the cargo space 16 is accessible regardless of the position of the front seats 12. Opening of the panel assembly 18 in the second open mode greatly increases the convenience and accessibility of the cargo space 16.

Variations and modifications are possible without departing from the scope and spirit of the present invention as defined by the appended claims.

The embodiments in which an exclusive property or privilege is claimed are defined as follows:

1. A locking hinge assembly comprising:
   first and second hinge members each having a respective hinge section and mounting flange section;
   said first and second hinge members pivotably connected together by a hinge pin at said hinge sections and pivotably movable between a first position and a second position;
   one of said respective mounting flange section having a channel extending for slidably receiving a locking bar along said channel's longitudinal axis;
   said locking bar having at least one locking flange;
   said locking flange being substantially flat and extending substantially transverse from the longitudinal length of said locking bar and extending through aligned apertures in said mounting flange sections along the length of said locking bar;
   said locking flange having a hook section co-planar with said locking flange at a distal section thereof such that when said locking bar slides along its longitudinal axis to a locking position, said locking bar and hook section engage both mounting flanges to lock said hinge members in said first position; and
   said locking bar having a longitudinally extending section being substantially flat and co-planar with said flange and hook section.

2. A locking hinge assembly as defined in claim 1 further comprising:
   said locking bar having a longitudinally extending section being substantially flat and co-planar with said flange and hook section.

3. A locking hinge member as defined in claim 2 further comprising:
   said at least one locking flange being at least two spaced apart locking flanges;
   said aligned apertures in said mounting flange being numbered and positioned to receive said two spaced apart locking flanges; and
   said locking flanges being co-planar with each other.

4. A locking bar for a pivotable hinge assembly comprising:
   a longitudinally extending bar section;
   at least one flange laterally extending from said bar section;
   said at least one flange being substantially flat;
   said at least one flange having a hook section being co-planar with said at least one flange section; and said locking bar having a raised handle with respect to said longitudinally extending bar section at one terminal end thereof in a transverse direction from said flange and hook section.

5. A locking bar as defined in claim 4 further comprising:

said longitudinally extending bar section being substantially flat and co-planar with said flange and hook section.

6. A locking bar as defined in claim 5 further comprising:

said longitudinally extending bar section has protrusions that extend transverse from said longitudinally extending bar section.

7. A locking bar as defined in claim 5 further comprising:

said at least one flange being a plurality of flanges spaced along the length of said extending bar section and being co-planar with each other.

8. A locking bar as defined in claim 4 further comprising:

said at least one flange being a plurality of flanges spaced along the length of said extending bar section and being co-planar with each other.

9. A locking bar as defined in claim 8 further comprising:

said longitudinally extending bar section has protrusions that extend transverse from said longitudinally extending bar section.

* * * * *